United States Patent
Anderson et al.

(10) Patent No.: US 8,654,974 B2
(45) Date of Patent: Feb. 18, 2014

(54) APPARATUS AND METHOD TO PROVIDE SECURE COMMUNICATION OVER AN INSECURE COMMUNICATION CHANNEL FOR LOCATION INFORMATION USING TRACKING DEVICES

(75) Inventors: Roger B. Anderson, Arcadia, CA (US); Jennifer B. Anderson, Arcadia, CA (US)

(73) Assignee: Location Based Technologies, Inc., Irvine, CA (US)

( * ) Notice: Subject to any disclaimer, the term of this patent is extended or adjusted under 35 U.S.C. 154(b) by 1602 days.

(21) Appl. No.: 11/874,831

(22) Filed: Oct. 18, 2007

(65) Prior Publication Data

US 2009/0103722 A1 Apr. 23, 2009

(51) Int. Cl.
*H04L 9/00* (2006.01)
*H04L 9/08* (2006.01)
*H04L 9/32* (2006.01)
*H04K 1/00* (2006.01)
*H04K 1/02* (2006.01)

(52) U.S. Cl.
USPC ............. 380/255; 380/44; 380/247; 380/281; 380/284; 713/171; 713/180

(58) Field of Classification Search
USPC ............ 380/44, 284, 281, 247, 255; 713/171, 713/180
See application file for complete search history.

(56) References Cited

U.S. PATENT DOCUMENTS

| | | | |
|---|---|---|---|
| 3,924,102 A | 12/1975 | Hanekom | |
| 4,218,582 A * | 8/1980 | Hellman et al. | ................. 380/30 |
| 4,850,007 A | 7/1989 | Marino et al. | |
| 5,079,541 A | 1/1992 | Moody | |
| 5,127,042 A | 6/1992 | Gillig et al. | |
| 5,353,331 A | 10/1994 | Emery et al. | |
| 5,386,468 A | 1/1995 | Akiyama et al. | |
| 5,432,542 A | 7/1995 | Thibadeau et al. | |
| 5,541,976 A | 7/1996 | Ghisler | |
| 5,555,286 A | 9/1996 | Tendler | |

(Continued)

FOREIGN PATENT DOCUMENTS

| | | |
|---|---|---|
| JP | 10325735 | 12/1998 |
| JP | 11064480 | 3/1999 |

(Continued)

OTHER PUBLICATIONS

Applicants Prior Art: (Applicant's Specification: 2. Description of Related Technology filed on Oct. 18, 2007); pp. 1, line 17-pp. 5, line 5.*

(Continued)

*Primary Examiner* — Edan Orgad
*Assistant Examiner* — Kari Schmidt

(57) ABSTRACT

A system for securing information. The system includes a first tracking device associated with an object or an individual. In one embodiment, the first tracking device generates independently a synchronous secret key and a server generates independently the synchronous secret key. Over an insecure communication channel, the server communicates an asynchronous vector pair encrypted with the synchronous secret key with the tracking device. To securely communicate information, messages are encrypted and decrypted using the asynchronous vector pair between the tracking device and the server. To further secure message information, a set of random numbers may be further utilized with the asynchronous vector pair to further encrypt and decrypt the messages communicated between the tracking device and the server.

16 Claims, 7 Drawing Sheets

(56) References Cited

U.S. PATENT DOCUMENTS

| | | |
|---|---|---|
| 5,565,909 A | 10/1996 | Thibadeau et al. |
| 5,592,173 A | 1/1997 | Lau et al. |
| 5,785,181 A | 7/1998 | Quartararo, Jr. |
| 5,862,511 A | 1/1999 | Croyle et al. |
| 5,876,765 A | 3/1999 | Hinterlechner et al. |
| 5,967,841 A | 10/1999 | Bianca et al. |
| 5,973,599 A | 10/1999 | Nicholson et al. |
| 6,088,453 A | 7/2000 | Shimbo |
| 6,141,356 A | 10/2000 | Gorman |
| 6,236,365 B1 | 5/2001 | LeBlanc et al. |
| 6,243,039 B1 | 6/2001 | Elliot |
| 6,278,370 B1 | 8/2001 | Underwood |
| 6,300,875 B1 | 10/2001 | Schafer |
| 6,327,533 B1 | 12/2001 | Chou |
| 6,388,612 B1 | 5/2002 | Neher |
| 6,414,629 B1 | 7/2002 | Curcio |
| 6,441,741 B1 | 8/2002 | Yoakum |
| 6,445,921 B1 | 9/2002 | Bell |
| 6,453,037 B1 | 9/2002 | Welter, Jr. |
| 6,498,797 B1 | 12/2002 | Anerousis et al. |
| 6,546,253 B1 | 4/2003 | Chow et al. |
| 6,611,755 B1 | 8/2003 | Coffee et al. |
| 6,633,835 B1 | 10/2003 | Moran et al. |
| 6,654,883 B1 * | 11/2003 | Tatebayashi ............... 713/168 |
| 6,674,368 B2 | 1/2004 | Hawkins et al. |
| 6,708,028 B1 | 3/2004 | Byrne |
| 6,716,101 B1 | 4/2004 | Meadows |
| 6,732,090 B2 | 5/2004 | Shanahan et al. |
| 6,735,630 B1 | 5/2004 | Gelvin et al. |
| 6,747,561 B1 | 6/2004 | Reeves et al. |
| 6,754,470 B2 | 6/2004 | Hendrickson et al. |
| 6,768,942 B1 | 7/2004 | Chojnacki |
| 6,774,838 B2 | 8/2004 | Sun |
| 6,778,089 B2 | 8/2004 | Yoakum |
| 6,812,824 B1 | 11/2004 | Goldinger et al. |
| 6,819,247 B2 | 11/2004 | Birnbach et al. |
| 6,833,787 B1 | 12/2004 | Levi |
| 6,850,252 B1 | 2/2005 | Hoffberg |
| 6,859,533 B1 | 2/2005 | Wang |
| 6,879,244 B1 | 4/2005 | Scalisi |
| 6,882,897 B1 | 4/2005 | Fernandez |
| 6,928,280 B1 | 8/2005 | Xanthos et al. |
| 6,937,726 B1 | 8/2005 | Wang |
| 6,952,181 B2 | 10/2005 | Karr et al. |
| 6,975,941 B1 | 12/2005 | Lau et al. |
| 6,978,021 B1 | 12/2005 | Chojnacki |
| 6,988,026 B2 | 1/2006 | Breed |
| 6,992,584 B2 | 1/2006 | Dooley et al. |
| 6,998,985 B2 | 2/2006 | Reisman et al. |
| 6,998,995 B2 | 2/2006 | Nakajima |
| 7,020,701 B1 | 3/2006 | Gelvin et al. |
| 7,038,590 B2 | 5/2006 | Hoffman et al. |
| 7,049,957 B2 | 5/2006 | Watson |
| 7,064,711 B2 | 6/2006 | Strickland et al. |
| 7,065,244 B2 | 6/2006 | Akimov |
| 7,065,348 B1 | 6/2006 | Aoki et al. |
| 7,065,370 B2 | 6/2006 | Ogaki et al. |
| 7,079,650 B1 | 7/2006 | Knudsen |
| 7,088,242 B2 | 8/2006 | Aupperle et al. |
| 7,088,252 B2 | 8/2006 | Weekes |
| 7,099,921 B1 | 8/2006 | Engstrom et al. |
| 7,109,868 B2 | 9/2006 | Yoakum |
| 7,119,669 B2 | 10/2006 | Lundsgaard et al. |
| 7,120,928 B2 | 10/2006 | Sheth et al. |
| 7,123,189 B2 | 10/2006 | Lalik et al. |
| 7,139,396 B2 | 11/2006 | Montgomery |
| 7,146,367 B2 | 12/2006 | Shutt |
| 7,149,189 B2 | 12/2006 | Huntington et al. |
| 7,155,238 B2 | 12/2006 | Katz |
| 7,158,912 B2 | 1/2007 | Vock et al. |
| 7,181,192 B2 | 2/2007 | Panasik et al. |
| 7,200,673 B1 | 4/2007 | Augart |
| 7,218,242 B2 | 5/2007 | Scalisi et al. |
| 7,246,007 B2 | 7/2007 | Ferman et al. |
| 7,257,836 B1 | 8/2007 | Moore |
| 7,268,700 B1 * | 9/2007 | Hoffberg .................... 340/905 |
| 7,272,212 B2 | 9/2007 | Eberle et al. |
| 7,272,662 B2 | 9/2007 | Chesnais et al. |
| 7,284,191 B2 | 10/2007 | Grefenstette et al. |
| 7,292,223 B2 | 11/2007 | Suprun et al. |
| 7,299,277 B1 | 11/2007 | Moran et al. |
| 7,302,634 B2 | 11/2007 | Lucovsky et al. |
| 7,313,825 B2 | 12/2007 | Redlich et al. |
| 7,501,952 B2 | 3/2009 | Forster |
| 7,501,984 B2 | 3/2009 | Forster et al. |
| 7,598,855 B2 | 10/2009 | Scalisi |
| 7,612,663 B2 | 11/2009 | Sun |
| 7,626,499 B2 * | 12/2009 | Burneske et al. ........ 340/539.13 |
| 7,728,724 B1 | 6/2010 | Scalisi et al. |
| 7,742,774 B2 | 6/2010 | Oh et al. |
| 7,826,968 B2 | 11/2010 | Huang et al. |
| 7,995,994 B2 * | 8/2011 | Khetawat et al. ............ 455/410 |
| 8,081,072 B2 | 12/2011 | Scalisi et al. |
| 2001/0030667 A1 | 10/2001 | Kelts |
| 2001/0048364 A1 | 12/2001 | Kalthoff et al. |
| 2002/0041328 A1 | 4/2002 | LeCompte et al. |
| 2002/0067256 A1 | 6/2002 | Kail, IV |
| 2002/0077130 A1 | 6/2002 | Owensby |
| 2002/0180602 A1 | 12/2002 | Yoakum |
| 2002/0186135 A1 | 12/2002 | Wagner |
| 2002/0196123 A1 | 12/2002 | Diehl et al. |
| 2003/0043200 A1 | 3/2003 | Faieta et al. |
| 2003/0131073 A1 | 7/2003 | Lucovsky et al. |
| 2003/0177094 A1 * | 9/2003 | Needham et al. .............. 705/50 |
| 2003/0208518 A1 | 11/2003 | Gura |
| 2003/0210262 A1 | 11/2003 | Gahm et al. |
| 2003/0212729 A1 | 11/2003 | Eberle |
| 2003/0235307 A1 * | 12/2003 | Miyamoto .................... 380/269 |
| 2004/0010689 A1 | 1/2004 | Vanstone |
| 2004/0021573 A1 | 2/2004 | Hoffman et al. |
| 2004/0114756 A1 | 6/2004 | Moller |
| 2004/0165726 A1 * | 8/2004 | Yamamichi et al. .......... 380/277 |
| 2004/0166879 A1 | 8/2004 | Meadows et al. |
| 2004/0172403 A1 | 9/2004 | Steele et al. |
| 2004/0212493 A1 | 10/2004 | Stilp |
| 2005/0012620 A1 | 1/2005 | Yoakum |
| 2005/0024201 A1 | 2/2005 | Culpepper et al. |
| 2005/0044356 A1 * | 2/2005 | Srivastava et al. ............ 713/163 |
| 2005/0071282 A1 | 3/2005 | Lu et al. |
| 2005/0071736 A1 | 3/2005 | Schneider et al. |
| 2005/0099303 A1 | 5/2005 | Suckerman |
| 2005/0113124 A1 | 5/2005 | Syrjarinne et al. |
| 2005/0145688 A1 | 7/2005 | Milenkovic et al. |
| 2005/0159883 A1 | 7/2005 | Humphries et al. |
| 2005/0181870 A1 | 8/2005 | Nguyen et al. |
| 2005/0188403 A1 | 8/2005 | Kotzin |
| 2005/0202830 A1 | 9/2005 | Sudit |
| 2005/0210260 A1 * | 9/2005 | Venkatesan et al. .......... 713/180 |
| 2005/0246647 A1 | 11/2005 | Beam et al. |
| 2005/0248459 A1 | 11/2005 | Bonalle et al. |
| 2006/0009152 A1 | 1/2006 | Millard et al. |
| 2006/0084420 A1 | 4/2006 | Smith et al. |
| 2006/0161377 A1 | 7/2006 | Rakkola et al. |
| 2006/0205416 A1 | 9/2006 | Kayzar et al. |
| 2006/0206246 A1 | 9/2006 | Walker |
| 2006/0211405 A1 | 9/2006 | Scalisi et al. |
| 2006/0232449 A1 | 10/2006 | Jain et al. |
| 2006/0253590 A1 | 11/2006 | Nagy et al. |
| 2006/0290497 A1 | 12/2006 | Sugata |
| 2007/0028088 A1 | 2/2007 | Bayrak et al. |
| 2007/0033531 A1 | 2/2007 | Marsh |
| 2007/0053513 A1 | 3/2007 | Hoffberg |
| 2007/0054530 A1 | 3/2007 | Bauer et al. |
| 2007/0057068 A1 | 3/2007 | Tsai |
| 2007/0061303 A1 | 3/2007 | Ramer et al. |
| 2007/0073719 A1 | 3/2007 | Ramer et al. |
| 2007/0083819 A1 | 4/2007 | Shoemaker |
| 2007/0103296 A1 | 5/2007 | Paessel et al. |
| 2007/0159322 A1 | 7/2007 | Campbell |
| 2007/0229350 A1 | 10/2007 | Scalisi et al. |
| 2007/0255620 A1 | 11/2007 | Tumminaro et al. |
| 2007/0287473 A1 * | 12/2007 | Dupray ...................... 455/456.1 |
| 2007/0288427 A1 | 12/2007 | Ramer et al. |
| 2008/0010585 A1 | 1/2008 | Schneider |

(56) References Cited

U.S. PATENT DOCUMENTS

| | | | |
|---|---|---|---|
| 2008/0028063 A1 | 1/2008 | Holmes et al. | |
| 2008/0059504 A1 | 3/2008 | Barbetta et al. | |
| 2008/0059889 A1 | 3/2008 | Parker et al. | |
| 2008/0088437 A1 | 4/2008 | Aninye et al. | |
| 2008/0090550 A1 | 4/2008 | Scalisi et al. | |
| 2008/0108370 A1 | 5/2008 | Aninye | |
| 2008/0109762 A1 | 5/2008 | Hundal et al. | |
| 2008/0129491 A1 | 6/2008 | Ruperto et al. | |
| 2008/0171559 A1 | 7/2008 | Frank et al. | |
| 2008/0172173 A1* | 7/2008 | Chang et al. | 701/207 |
| 2008/0227473 A1 | 9/2008 | Haney | |
| 2008/0228654 A1* | 9/2008 | Edge | 705/71 |
| 2008/0252254 A1 | 10/2008 | Osada | |
| 2008/0252459 A1 | 10/2008 | Butler et al. | |
| 2009/0098857 A1 | 4/2009 | De Atley | |
| 2009/0098903 A1 | 4/2009 | Donaldson et al. | |
| 2009/0111393 A1 | 4/2009 | Scalisi et al. | |
| 2009/0117921 A1 | 5/2009 | Beydler et al. | |
| 2009/0119119 A1 | 5/2009 | Scalisi et al. | |
| 2009/0174603 A1 | 7/2009 | Scalisi et al. | |
| 2009/0177385 A1 | 7/2009 | Matas et al. | |
| 2009/0189807 A1 | 7/2009 | Scalisi et al. | |
| 2009/0315706 A1 | 12/2009 | Scalisi et al. | |
| 2009/0315767 A1 | 12/2009 | Scalisi et al. | |
| 2012/0086571 A1 | 4/2012 | Scalisi et al. | |
| 2012/0089492 A1 | 4/2012 | Scalisi et al. | |

FOREIGN PATENT DOCUMENTS

| | | |
|---|---|---|
| JP | 13074494 | 3/2001 |
| JP | 2003284123 A | 10/2003 |
| WO | 0163315 A | 8/2001 |
| WO | WO-2007107022 | 9/2007 |

OTHER PUBLICATIONS

Huff, Greg H., et al., "Directional Reconfigurable Antennas on Laptop Computers: Simulation, Measurement and Evaluation of Candidate Integration Positions", *IEEE Transactions on Antenaas*, vol. 52, No. 12, (Dec. 2004),pp. 3220-3227.

Fredrick, Jonathan D., et al., "Smart Antennas Based on Spatial Multiplexing of Local Elements (SMILE) for Mutual Coupling Reduction", *IEEE Transactions on Antennas and Propagation*, vol. 52, No. 1, (Jan. 2004),pp. 106-114.

"Electric Vehicle (EV) Charging Information", *Pasadena Water & Power Website*, www.cityofpasadena.net.

"Mobile Transmit Diversity", *Magnilia Broadband Internet Article*, 14 pages.

Hansen, Michael "Overmolding: A Multifaceted Medical Device Technology", *Medical Device & Diagnostic Industry*, (Jan. 2006),5 pages.

"Material Property Data for Various Thermoplastic Elastomers", *MATLAB*, (May 29, 2007),7 pages.

Mannion, Patrick "Antenna Diversity Doubles CDMA Net Capacity", *EE Times* (May 12, 2003),3 pages.

Burk, Steve "Overmolding of Embedded Electronics", *Connector Specifier*, Retrieved from the Internet at http:/cs.pennet.com on May 20, 2007,(Apr. 2001),4 pages.

Schuster, Mike et al., "Increasing the Frequency Response of the ADXL Series Accelerometers", *Analog Devices Application Note AN-377*, (Feb. 2006),1 page.

"Small and Thin +_5g Accelerometer", *Analog Devices—ADXL320*, (2004),16 pages.

Matsakis, Demetrios "The Timing Group Delay (TGD) Correction and GPS Timing Basis", *Proceedings of the 63rd Annual Meeting of the Institute of Navigation*, Cambridge, MA, (Apr. 2007),6 pages.

"GPS Compass Solutions—Application vs. Accuracy", *CEACT Information Systems*, (Sep. 13, 2006),10 pages.

"ET301 GPS-UAV Developement Platform", (Jul. 12, 2006),11 pages.

Lemaire, Christophe "Surface Micromachined Sensors for Vehicle Navigation Systems", *Analog Devices, Inc.*, Retrieved from the Internet from http://www.analog.com/en/content/0,2886,764%255F800%255F8077%255F0,00.html on Dec. 25, 2007.,4 pages.

Li, Xiaojing et al., "The Complementary Characteristics of GPS and Accelerometer in Monitoring Structural Deformation", *ION 2005 Meeting*, (2005),9 pages.

Li, Xiaojing et al., "Full-Scale Structural Monitoring Using an Integrated GPS and Accelerometer System", *University of New South Wales*, (Feb. 14, 2006),15 pages.

"Notice of Reasons for Rejection" mailed Apr. 18, 2012, Japanese Application No. 2009-521880, 4 pages.

\* cited by examiner

APPARATUS AND METHOD TO PROVIDE SECURE COMMUNICATION OVER AN INSECURE COMMUNICATION CHANNEL FOR LOCATION INFORMATION USING TRACKING DEVICES

BACKGROUND OF THE INVENTION

1. Field of the Invention

The invention relates generally to the field of communications systems that securely provide location information of a tracking unit. More particularly, the present invention relates to an encryption apparatus and methodology for a tracking unit to securely transfer location information over an insecure communication channel. The tracking unit associated with an individual or object uses any of the following: wireless data transfer, wireless location and tracking systems, and wireless communication system (WCS).

2. Description of Related Technology

In conventional communication systems, location information of individuals may be monitored. For instance, location information such as positional coordinates may be tracked or monitored for a variety of individuals, such as children, Alzheimer's syndrome patients, or mentally ill persons. Furthermore, location information for animals, such as cats and dogs, may be tracked using these conventional systems to locate a lost or stolen animal. In other conventional communication systems, scientists, such as zoologists, track, for example, wild animals to study and collect data related to their mating and/or nocturnal behavioral patterns.

In addition, objects are also tracked or located that use these systems. For example, merchants choose to track the location of goods as part of an inventory function and/or an anti-theft mode. In another example, police often use location-tracking systems to facilitate recovery of stolen automobiles, such as the LoJack™ vehicle recovery system offered by the LoJack Corporation of Westwood, Mass., in the United States. Automobile rental agencies often track a location of automobiles that customers rent to ensure their automobile is maintained within a contracted rental use boundary. Other location systems provided in select automobiles assist a driver navigating to a desired destination, such as the OnStar™ system offered by the OnStar Corporation of Detroit, Mich., in the United States.

Global Positioning System (GPS) technology may be incorporated in these conventional communication systems. GPS technology determines positional information of a GPS receiver based on measuring signal transfer times between satellites having known positions and the GPS receiver. The signal transfer time of a signal is proportional to a distance of a respective satellite from the GPS receiver. Consequently, the distance between the satellite and the GPS receiver can be converted, utilizing signal propagation velocity, into a respective signal transfer time. The positional information of the GPS receiver is calculated based on distance calculations from at least four satellites.

As such, GPS technology provides outdoor, line-of-sight communication between a GPS receiver and a centralized station within areas that are unobstructed by fabricated structures and natural features. Fabricated structures may include multi-story buildings, bridges, dams, and the like. Natural features include mountains, hills, valleys, canyons, cliffs, and the like. Exemplary products, such as Wherifone™ and Guardian Lion™, use GPS technology to track individuals and/or objects from a centralized monitoring station.

To protect information associated with tracking individuals and/or objects, the location information needs to be securely transferred to a remote monitoring terminal. Cryptography techniques may be utilized to protect contents of information sent between a tracking device and a monitoring station. A conventional cryptography technique may include Shift Ciphers. Shift Ciphers shift letters using a function, e.g., mod 26, to encrypt and decrypt letters and are limited, in this case, to 26 possible encodings per letter. Another conventional cryptography technique (e.g., Diffie-Hellman) includes generation of a symmetric key. More specifically, a Diffie-Hellman exchange is a cryptographic protocol that allows two parties that have no prior knowledge of each other to jointly establish a shared secret key over an insecure communication channel. The symmetric key generated independently by each is used to encrypt and decrypt subsequent communication. To generate the symmetric key, each party in Diffie-Hellman solves a discrete logarithm problem. However, Diffie-Hellman does not provide authentication of the parties; thus, this approach may be vulnerable to another party establishing the two distinct Diffie-Hellman keys and decrypting the message through performing a multitude a decrypting and/or encrypting steps. Another conventional cryptography technique involves substitution ciphers, e.g., Affine Ciphers. Unfortunately, there are crypto-analysis attack ciphers available to decrypt substitution ciphers.

Another type of security key is a block cipher, such as Advanced Encryption Standard (AES) announced by the National Institute of Standards and Technology (NIST) as U.S. FIPS PUB 197 (FIPS 197) on Nov. 26, 2001. AES became a recognized standard on May 26, 2002. In 2006, AES became one of the most popular algorithms associated with symmetric key cryptography. In many conventional cryptography systems, AES variables include a fixed block size of 128 bits and a key size selected by the parties of 128, 192, or 256 bits. In other conventional AES systems, variables may be specified with key and block sizes in 32 bit multiples having a minimum of 128 bits and a maximum of 256 bits. When utilizing this system, many cryptographers worry security of AES may be inadequate. For instance to achieve a cryptographic break, a 128 bit key AES cryptographic attack requires only $2^{120}$ operations as compared to $2^{128}$ possible keys. To further increase AES security, larger size keys, e.g., 192 and 256 bits, are utilized at the expense of increased computational burden.

Representative cryptography patents (which are herein incorporated by reference) include U.S. Pat. No. 6,088,453 entitled "Scheme for Computing Montgomery Division and Montgomery Inverse Realizing Fast Implementation" by inventor Atsushi Shimbo that issued Jul. 11, 2000, disclosed an algorithm to perform high speed Montgomery division; U.S. Pat. No. 6,850,252 entitled "Intelligent Electronic Appliance System and Method" by inventor Steven M. Hoffberg, which issued on Feb. 1, 2005, disclosed compressing a video stream compression; and U.S. Pat. No. 6,859,533 entitled "System and Method for Transferring the Right to Encode Messages in a Symmetric Encoding Scheme" by inventor Xin Wang et. al., which issued on Feb. 22, 2005, disclosed methodology to pass encrypted files.

Other conventional cryptographic methodologies (herein incorporated by reference) include those in: U.S. Pat. No. 6,937,726 entitled "System and Method for Protecting Data Files by Periodically Refreshing a Decryption Key" by inventor Xin Wang, which issued on Aug. 30, 2005, disclosed a periodic key refresh procedure; U.S. Pat. No. 7,079,650 entitled "Computing Method Elliptic Curve Cryptography" by inventor Erik Knudsen, which issued on Jul. 18, 2006, disclosed a public/private key encryption scheme; U.S. Pat. No. 7,139,396 entitled "Koblitz Exponentiation with Bucketing" by inventor Peter L. Montgomery, et. al, which issued on Nov. 21, 2006, disclosed a method for modular exponentiation; and US Patent Publication 20070053513 entitled "Intelligent Electronic Appliance System and Method" by inventor Steven M. Hoffberg, which issued on Mar. 8, 2007, disclosed an electronic appliance that interprets motion of a human.

Still other conventional cryptographic methods (that are herein incorporated by reference) include elliptic curve point operations as described in U.S. Patent Application Publication No. US 2004/0114756 published Jun. 17, 2004, entitled "Method for Elliptic Curve Point Multiplication" by inventors Moller et al. and US Patent Application Publication No. US 2004/0010689 by inventors Vanstone, et al., published Jan. 15, 2004, entitled "Method and Apparatus for Performing Elliptic Curve Arithmetic" (which are both herein incorporated by reference).

Still other cryptographic methods include a symmetric encryption/decryption architecture disclosed in Patent Application Publication No. US 2007/0028088, published Feb. 1, 2007, entitled "Polymorphic Encryption Method and System" by inventors Bayrak et al. (which is herein incorporated by reference). In this symmetric decoding/encoding architecture, a 52-letter character set forms a key for encryption/decryption of messages. The key corresponds to all of the uppercase and the lowercase letters in the English alphabet. The encrypted messages may be compressed and an XOR function to thwart a malicious attack. This methodology added to a message length because each letter of a message being randomly assigned a 52 letter designation increases memory storage requirements. In addition, the use of a symmetric encryption/decryption key, once cracked, would allow eavesdroppers to read and transmit messages.

Consequently, what is needed is a cryptographic security scheme to encrypt a message for secure transmission over an insecure communication channel that provides additional advantages over conventional cryptographic security systems. These advantages would include, inter alia, minimal addition of overhead bits to a message, reduced instruction set for encrypting/decrypting messages, a compression algorithm capable of eliminating or reducing a redundancy of message characters, and other features that provide increased security when monitoring data and location information acquired from a tracking device to prevent small byte messages detection by unauthorized individuals.

SUMMARY OF THE INVENTION

In a first aspect of the present invention, an apparatus is disclosed for communicating location coordinate information over an insecure communication channel. The apparatus includes a first tracking device. In one embodiment, the first tracking device communicates first cipher seed values with a location coordinate monitoring station. The first cipher seed values are utilized to generate independently a first synchronous key by each the tracking device and the location coordinate monitoring station. The location coordinate monitoring station selects asynchronous vector pairs to encrypt with the first synchronous key before transmitting the asynchronous vector pair to the tracking device. The tracking device decrypts the asynchronous vector pairs using the first synchronous key. In one embodiment, messages communicated utilizing the insecure communication channel between the tracking device and the location coordinate monitoring station use at least one of the asynchronous vector pairs.

In one variant, second cipher seed values are exchanged between the location coordinate monitoring station and the tracking device to independently generate a second synchronous key by each the tracking device and the location coordinate monitoring station. A set of random numbers are encrypted with the second synchronous key and communicated between the location coordinate monitoring station and the tracking device. In this variant, messages communicated utilizing the insecure communication channel are decrypted and encrypted utilizing at least one of the asynchronous vector pairs and at least one of the set of random numbers.

In a second aspect of the present invention, a method is disclosed for securely communicating location coordinates between at least one of a first party and a second party. The method includes the steps of accessing an insecure communication channel by the first party and the second party; selecting a first secret random number password independently by the first party; selecting a second secret random number password independently by the second party; and independently computing by the first and the second party a first synchronous key. The method may include the step of collectively selecting first and second pseudo-random values utilized for independently computing the first synchronous key by the first party and the second party respectively. The method may include the step of transmitting a vector transform pair encrypted by the first synchronous key by at least one of the first party and the second party. The method may also include the step of decrypting the vector transform pair by at least one of the first party and the second party to encrypt and decrypt messages communicated between the first and the second party.

In yet another embodiment, the method may include the step of exchanging cipher information to generate independently a second synchronous key by the first and the second party. In this same embodiment, the method may include the step of communicating a pseudo-random number set encrypted by the second synchronous key between the first party and the second party. In one variant, the method may include the step of encrypting messages utilizing the vector transform pair and at least one of the pseudo-random number set to securely communicate between the first and the second party.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1:
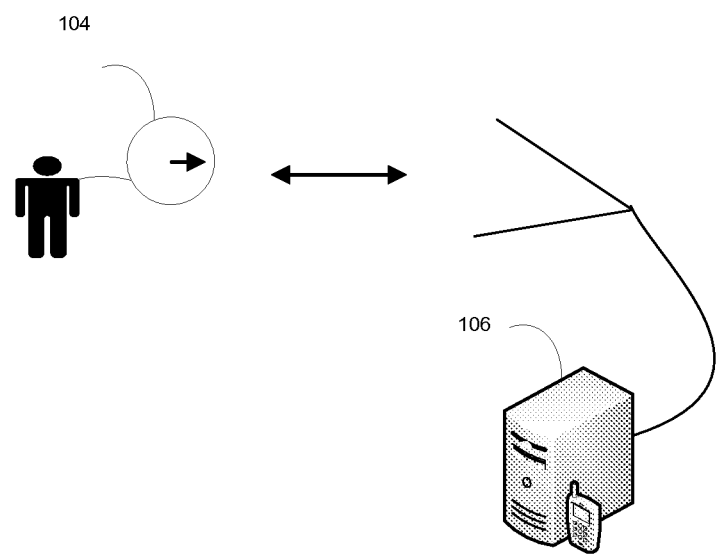
FIG. 1 is an overview of a location and tracking system in accordance with an embodiment of the present invention.

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates.

As used herein, the terms "tracking device" refers to without limitation to any integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and/or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

As used herein, the terms "wireless data transfer", "wireless tracking and location system", "positioning system," and "wireless positioning system" refer without limitation to any wireless system that transfers and/or determines location coordinates using one or more devices, such as Global Positioning System (GPS). The terms "Global Positioning System" refer to without limitation any services, methods, or devices that utilize GPS technology that determine a position of a GPS receiver based on measuring signal transfer times between satellites having known positions and the GPS receiver. The signal transfer time for a signal is proportional to a distance of the respective satellite from the GPS receiver. The distance between the satellite and the GPS receiver may be converted, utilizing signal propagation velocity, into the respective signal transfer time. The positional information of the GPS receiver is calculated based on distance calculations from at least four satellites.

As used herein, the terms "APGS", "Assisted GPS", or "A-GPS", refers to without limitation to any services, methods, or devices that utilizes an assistance server to help reduce required time to determine a location using GPS (such as in urban areas, when the user is located in "urban canyons", under heavy tree cover, or even indoors.) The development of APGS is fuelled, in part, by the U.S. Federal Communications Commission's E911 to have location coordinates of a mobile device available to emergency call dispatchers. In A-GPS networks, the receiver, has limited processing power and normally under less than ideal locations for position fixing, and communicates with the assistance server that has high processing power and access to a reference network. Since the A-GPS receiver and the Assistance Server share tasks, it provides a capability to provide more efficient location tracking capability than regular GPS, and improved cellular coverage.

As used herein, the terms "wireless communication system" refers to, without limitation, any system that uses communication stations and a wireless location means for determining positional coordinates such as Global Positioning Radio Service (GPRS).

As used herein, the term "network" refers to any telecommunications network, data network, or Voice Over IP (VOIP) network such as, without limitation, satellite, radio, microwave, millimeter-wave, RF wireless, RF cable, optical, and networking protocols (such as IEEE 802.11g), transmission media, and communications connections any combinations thereof.

As used herein, the term "server" refers to any computer element that stores or transfers data, information, or computer applications between one or more computer devices, such as mobile phones, laptop computers, user computer terminal, or the like, utilizing a network.

Overview

In one salient aspect, the present invention discloses apparatus and method of providing a system, including tracking devices, back-end systems, web interfaces, and voice interfaces, to securely communicate information, inter alia, location coordinates of a tracking device over an insecure communication channel. In particular, the tracking device has a transceiver. The tracking device receives a first signal from a remote user terminal, e.g., location coordinate monitoring station, another transceiver, or server, to advantageously selectively share information. First cipher seed values are utilized to generate independently a first security key by each the tracking device and the remote user terminal. The remote user terminal selects vector pairs to encrypt/decrypt messages. The remote user terminal encrypts in a second signal the vector pairs with the first security key and communicates the second signal with the tracking device. The tracking device decrypts the vector pairs using the first security key. Using a first secure communication mode, messages, e.g., including location coordinates, communicated are encrypted and decrypted using the insecure communication channel between the tracking device and the remote user terminal.

In another example, second cipher seed values are exchanged between the remote user terminal and the tracking device. The second cipher seed values are utilized to independently generate a second security key by each the remote user terminal and the tracking device. The remote user terminal encrypts a third signal utilizing a set of random numbers with the second security key or code and communicates the third signal to the tracking device. The set of random numbers are decrypted at the tracking device. Using a second secure communication mode, the messages, e.g., location coordinates, are communicated utilizing one or more of the vector pairs and one or more the set of random numbers. In one example, the one or more vector pairs and the set of random numbers are selected in accordance with a counter value (associated with a tracking device or server), which is incremented or decremented once a vector pair or a number in the set of random numbers is utilized to decrypt or encrypt a message. In another example, an identification code or ID, for instance, which is part of a message indicating which vector pair or a number from the set of random numbers was utilized to decrypt or to encrypt a message.

The present invention may be used encrypt and decrypt location coordinates to monitor a tracking device as discussed, for example, in patent application Ser. No. 11/753,979 filed on May 25, 2007, entitled "Apparatus and Method for Providing Location Information on Individuals and Objects using Tracking Devices", which is herein incorporated by reference. If the location coordinates of the tracking device violates one or more rules defined by a subscriber of the location tracking system, the subscriber (or a designated guardian or representative) may be notified, for example, through wireless telephone, plain old telephone system (POTS), Internet, text message, email, vibration, sound, voice, or the like.

Broadly, the present invention generally provides an apparatus and method for securing information between a tracking device and a remote user terminal. The system produced according to the present invention may find beneficial use for locating and tracking people, such as missing, lost, or abducted persons, Alzheimer's syndrome patients, or mentally ill persons. The system may also be useful for locating and tracking animals. Additionally, objects, such as vehicles, goods, and merchandise may be located and tracked with the system produced by the present invention.

Furthermore, a tracking device may be incorporated in form factors including a pen carried in a pocket or backpack, an inner surface of a shoe, a button, a necklace, a toy, a shirt collar, decoration, fabric of a jacket or sweater, or the like. In addition, different device skins are available to camouflage a tracking device. For instance, a device skin, such as a plastic sticker or housing, attaches to a tracking device to blend tracking device appearance with that of an object or individual. Consequently, in the event of abduction, an abductor is unlikely to remove and discard a concealed tracking device as compared to conventional tracking devices. The tracking devices may be incorporated as part of a conspicuous device, such as with or part of a mobile phone, pager, personal data assistant or any other recognizable electronic device.

The present invention may be utilized for secure communication (over an insecure channel) with a substantially waterproof and shockproof device, as discussed incorporated by reference patent application Ser. No. 11/753,979 and, in one instance, substantially sealed and having no exposed metal contacts. A tracking device may be remotely monitored by using a wireless device, such as a mobile or cell phone, through a monitoring station, e.g., location coordinate monitoring station, or even another tracking device.

Exemplary Extension Apparatus

Referring now to FIGS. 1-6 are exemplary embodiments of the encoding and decoding apparatus of a location tracking and monitoring system of the invention described in detail. It will be appreciated that while described primarily in the context of tracking individuals or objects, at least portions of the apparatus and methods described herein may be used in other applications. Other applications including monitoring velocity of items traveling through an assembly line process to determine which process portions are efficient and which may require process improvements or modifications. Other application may include electronic module assembly to securely communicate electrical and measurement properties acquired during testing cycles or after module assembly. A myriad of other functions will be recognized by those of ordinary skill in the art given the present disclosure.

Message Encryption/Decryption

Figure 2:
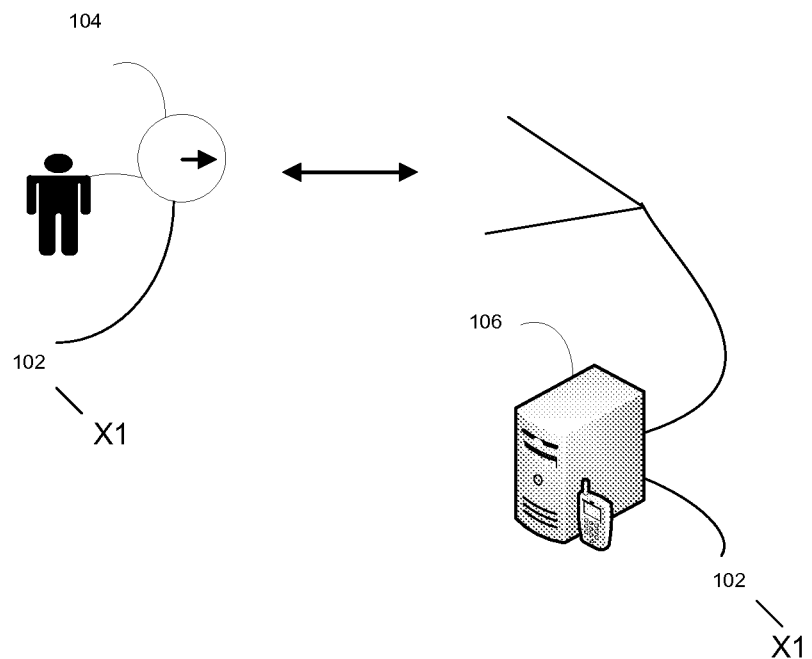
FIG. 2 is a diagram illustrating a first cipher seed values exchange in accordance with an embodiment of the present invention.
Figure 3:
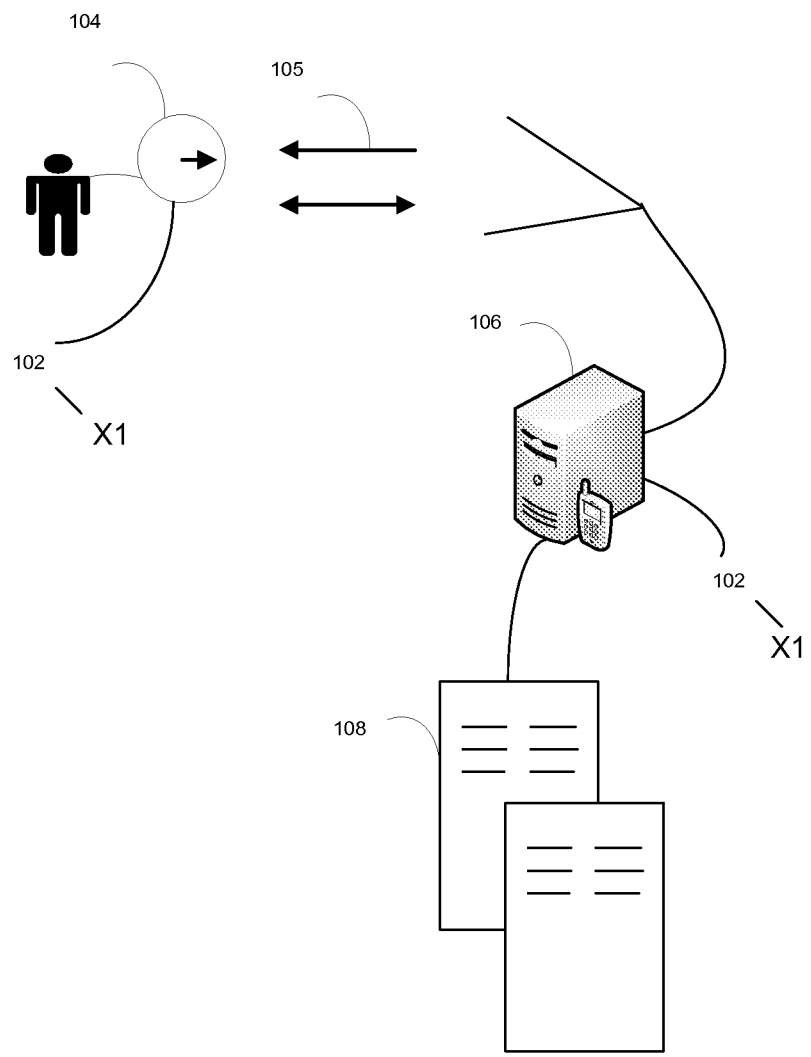
FIG. 3 is a diagram illustrating a first encryption scheme for encoding and decoding a message in accordance with an embodiment of the present invention.

Referring to FIG. 1, a tracking device 104 and a server 106 communicate first cipher seed values (e.g., first cipher code). The first cipher seed values are utilized to generate a first secret key, e.g., a first synchronous key, 102 (as shown in FIG. 2) each independently by the tracking device 104 and the server 106. The server 106 selects asynchronous vector transform pairs from Affine Transform Tables 108 (as shown in FIG. 3), e.g., having distinctive encryption as well as decryption vector transform pairs. The server 106 communicates a first signal 105, including the asynchronous vector transform pairs being combined functionally, e.g., XOR with, the first synchronous key 102, to the tracking device 104 (as shown in FIG. 3). The tracking device 104 decodes the first synchronous key 102 from the first signal 105 and stores the asynchronous vector transform pairs. The tracking device 104 communicates an acknowledge receipt upon successfully decryption of the asynchronous vector transform pairs to the server 106. The server 106 communicates a confirmation receipt to the tracking device 104 to encrypt messages at a first encryption/decryption level. At this point, messages communicated between the server 106 and the tracking device 104 are encrypted and decrypted using at least one of the asynchronous vector transform pairs.

Figure 4:
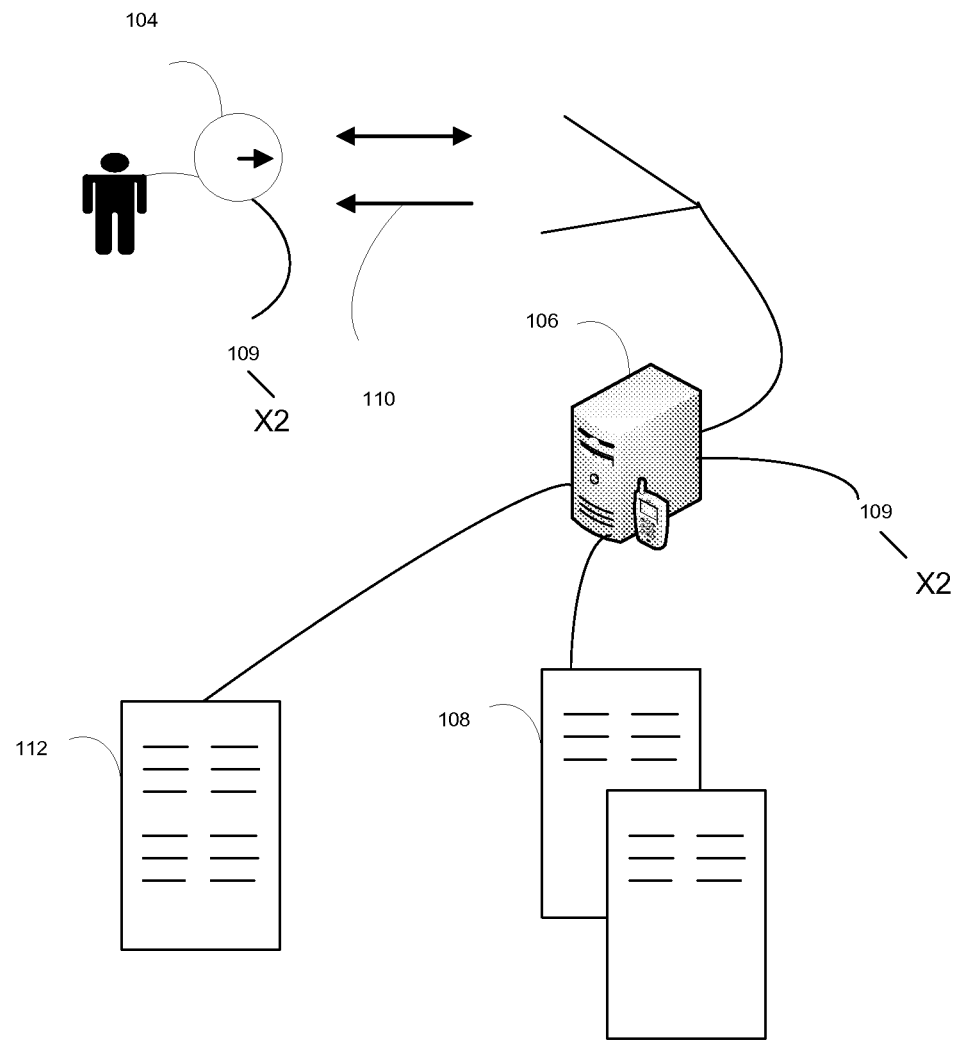
FIG. 4 is a diagram of a second cipher seed values exchange in accordance with an embodiment of the present invention.
Figure 5:
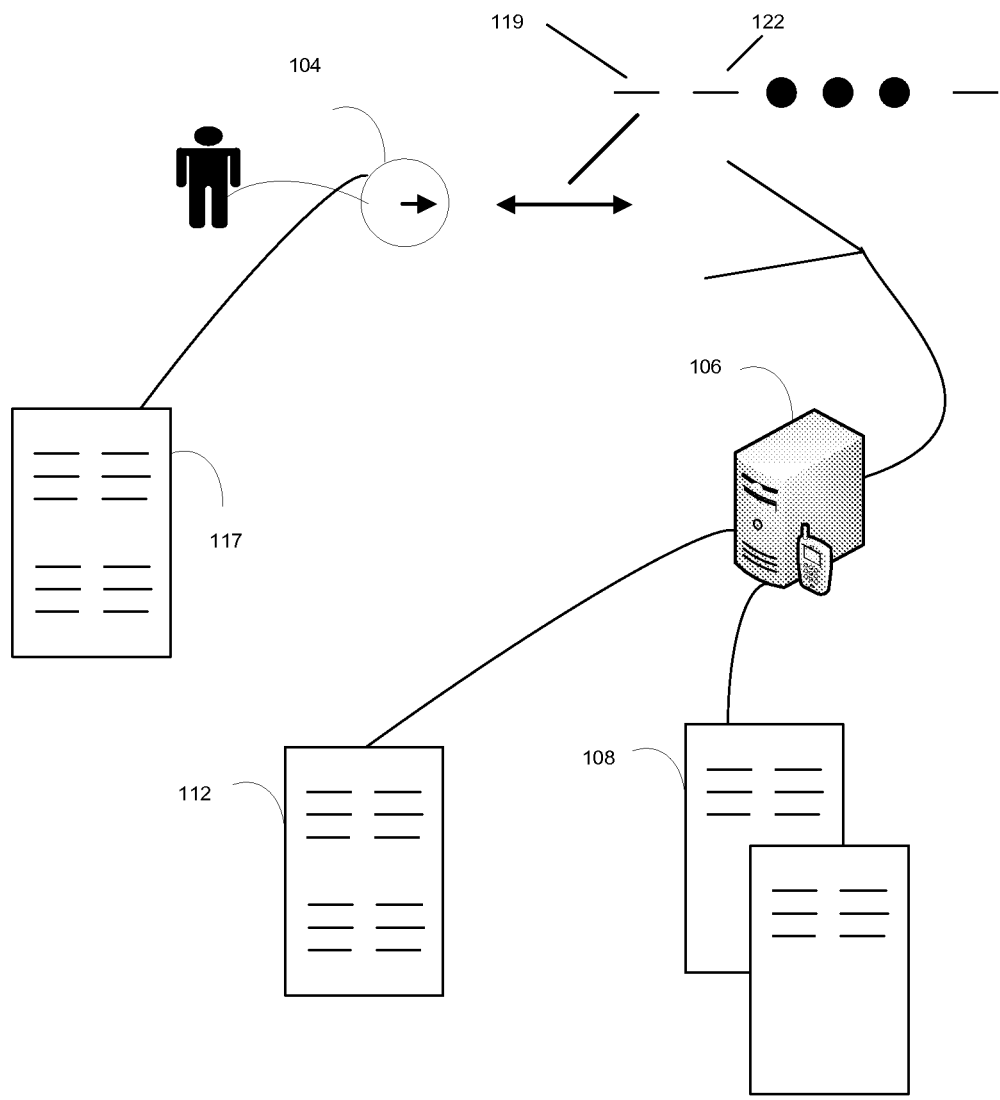
FIG. 5 is a diagram illustrating a second encryption scheme utilizing a random number set and an asynchronous vector transform pair in accordance with an embodiment of the present invention.

In one variant, a second cipher seed values are communicated between the tracking device 104 and the server 106 (as shown in FIG. 4). The tracking device 104 and the server 106 individually generate a second synchronous key 109 (as shown in FIG. 4). The server 106 selects and communicates a random number set 112 encrypted with the second synchronous key 109 in a second signal 110 to the tracking device 104. The tracking device 104 decrypts the random number set 112 from the second signal 110. The tracking device 104 communicates an acknowledgement receipt upon successfully decrypting the random number set 112 (as shown in FIG. 4) from the second signal 110 to the server 106 and switches to a second encryption/decryption level. The server 106 communicates a confirmation receipt and switches to the second encryption/decryption level. Using the second encryption/decryption level, messages communicated between the tracking device 104 and the server 106 are encrypted with at least one of the random number set and at least one of the asynchronous vector pairs (as shown in FIG. 5).

The present invention messages communicated over an insecure communication channel utilizing the asynchronous vector pairs and the random number set minimally add to message overhead. Thus, a short message service message remains a short message (e.g., waypoints that indicate location coordinates of the tracking device transmitted as part of a message remain substantially the same number of bits before and after an encryption/decryption process).

Consequently, the present invention encryption/decryption scheme advantageously requires less complex mathematics than many conventional encryption/decryption schemes (such as AES previous discussed); therefore, this method is applicable to low power (e.g., power efficient) tracking devices (to increase battery life) and have minimally sophisticated (e.g., slower clocking and bus speed) central processing units (CPUs). Furthermore, the present invention is also advantageous to high speed CPUs transmitters because it would allow the CPUs to operate at a lower performance level, thereby extending a battery life of the tracking device as compared with an encryption scheme requiring high performance level operating conditions.

The invention advantageously utilizes a random number set to mask that an asynchronous vector transform pairs was utilized to encrypt the message. Another advantage of the present invention is the use of multiple encryption/decryption schemes, where at least one of the encryption/decryption message schemes is asynchronous and the other is synchronous. As a result, eavesdroppers using a message hacking program that decrypts asynchronously encrypted messages will produce a random number sequence (or set) or indiscernible text message because synchronous message encryption is still present. Furthermore, eavesdroppers who use a message hacking program that decrypts synchronous encrypted messages will only produce indiscernible text (or a random number sequence) because asynchronous message encryption is still present.

Referring to FIG. 2, the tracking device 104 and the server 106 communicate first cipher seed values (e.g., first cipher code) to generate synchronous keys, e.g., values to encrypt and decrypt messages, over an insecure network. In one embodiment, the first synchronous key agreement is a non-authenticated key-agreement protocol, e.g., such as described in U.S. Pat. No. 4,200,770 (now expired) that is herein incorporated by reference. The Diffie-Hellman (D-H) cryptographic protocol defines a method for exchanging secret keys between two parties over an unsecured network. Similar to conventional cryptographic protocols, the D-H protocol makes use of the difficulties in factoring large numbers into primes to deter undesired message decryption. To provide secure communication, the large prime numbers need to be selected. In one embodiment, a Diffie-Hellman exchange occurs when a wireless non-secure network generates a new set of keys. This exchange may occur on at regular or non-periodic intervals (e.g. when the tracking device 104 may be charging its battery power level).

Referring to Tables I, II, the tracking device 104 and the server 106 exchange a prime random number p and a primitive root g. The tracking device 104 acknowledges receipt of an encryption setup process initiated by, in this example, the server 106. For instance, the tracking device 104 and the server 106 agree to use a prime number p=113083 and a primitive root g=2. The server 106 chooses, for example, a private number, e.g., secret random number a between 1 and p−1, of 76529. The server 106 calculates a first intermediate key $V=g^a \mod p$ and communicates the first intermediate key to the tracking device 104. The tracking device 104 chooses, for example, a private number, e.g., a secret random number b between 1 and p−1, of 24316.

In one variant, the tracking device 104 calculates second intermediate secret key $W=g^b \mod p$ and communicates the second intermediate key to the server 106. The server 106 communicates an acknowledge receipt of the second intermediate key to the tracking device 104. The tracking device 104 communicates an acknowledgement receipt for the second intermediate key to the server 106. The tracking device 104 computes $(g^b \mod p)^a$ and the server 106 computes $(g^a \mod p)^b$. The tracking device 104 and the server 106 now possess a first secret key because $(g^a \mod p)^b$ equals $(g^b \mod p)^a$.

TABLE I

Diffie-Hellman Key Exchange Variables

| Variable | Description | Use |
|---|---|---|
| p | the prime number | random prime number used for the key exchange |
| g | Generator | primitive root of the set defined by p |
| B | secret random number between 1 and p−1 | tracking device chooses random number |
| A | secret random number between 1 and p−1 | server chooses random number |
| W | intermediate calculation based upon a - transmitted to the server | tracking device calculates and transmits to the server |
| V | intermediate calculation based upon b - transmitted to the tracking device | server calculates and transmits to the tracking device |
| K | encryption key | secret key calculated independently by the tracking device and the server |

TABLE II

Server and Tracking Device calculate Synchronous Key1

1) Set prime p = 113083 (public knowledge)
2) Set generator g = 2 (public knowledge)
3) Server selects secret value a = 76529 (known only to Server)
4) Server calculates $V = g^a \mod p = 2^{76529} \mod 113083 = 55491$
5) Server transmits V = 55491 to Tracking Device (can be known to anyone)
6) Tracking Device selects secret value b = 24316 (known only to Tracking Device)
7) Tracking Device calculates $W = g^b \mod p = 2^{24316} \mod 113083 = 67798$
8) Tracking Device transmits W = 67798 to Server (can be known to anyone)
9) Server & Tracking Device independently calculate $K = V^b \mod p = 55491^{24316} \mod 113083 = 82456 = 67798^{76529} \mod 113083 = W^a \mod p$ (known only to Server & Tracking Device)

After first secret key generation, this embodiment advantageously discards the secret random numbers a and b; thus, no long term private keying material exists for discovery by eavesdroppers. Another advantage is the tracking device 104 or the server 106 may generate a new first secret key (e.g., including the generation of new secret random numbers, e.g., a, b) on a message-to-message basis or an occurrence of a specified event or condition. For example, the generation (and communication) of the secret random numbers a and b may occur when the tracking device 104 charges in a battery charger. In one variant, the battery charger may be electrically coupled to, for instance, to the server 106 using a wired or wireless communication network to exchange constants or cipher key values, e.g., p and g values.

In one embodiment, the tracking device 104 utilizes each combination, e.g., values for encryption/decryption, only once and the server 106 generates (e.g., in response to a tracking device 104 request) new values for encryption and decryption. Thus, an eavesdropper even with knowledge of previous values for encryption and/or decryption cannot decrypt future messages. In another embodiment, when the tracking device 104 or the server 106 detects (or suspects) an eavesdropper, the tracking device 104 or the server 106 (as a precaution may) generates a new set of values for encryption and/or decryption and communicate these values to one another.

Referring to Table IV, to further enhance message security, the first secret key may be translated, for example, using an integer value, e.g., provided by the server 106, and utilizing a hash function. In this example, the hash function utilized is MD5 on the first secret key to generate key1. In this same variant, key1 is also calculated by the tracking device 104 and the tracking device 104 communicates an acknowledgement receipt upon successful completion to the server 106.

Referring to FIG. 3, the server 106 encrypts a message with a selection from a set of asynchronous vector transform pairs for the tracking device 104. The asynchronous vector transform pairs are, for example, pairs selected from Affine Transform Tables 108. The Affine Transform Tables 108 includes matrix A (transform) and possibly a vector b (translation). The Affine Transform Tables 108 provides one or several linear transforms (including rotations, scaling, or shear) and translations (shifts). Several linear transformations may be combined in a single matrix, e.g., matrix A. In one variant, the Affine Transform Tables 108 include vector pairs, e.g., message encryption set having encoding pairs (i, j), and message decryption set including decoding pairs (k, l).

In one embodiment, an inverse of the encoding pairs (i, j), e.g., decoding pairs (k, l) may be obtained by calculating an inverse of i (e.g., $i^{-1}$) by performing:

```
i⁻¹ = (
    i = first_Affine_value
    m = modulo_value
    For x = 3 to m − 1 step 2
    If ((x * a) mod m) = 1
    Return x
    End if
    Next x
    // there is no inverse
    Return 0
)
```

* Please note, in this example, modulo is a power of 2 and i and i⁻¹ are an odd number.

Once we have $i^{-1}$, $j^{-1}$, in one example, is calculated by:

```
j⁻¹ = (
    w = inverse_of_i
    j = second_affine_value
    m = modulo_value
    Return ((w * (m − j)) mod m)
)
```

Together, the two algorithms return the unique Inverse Affine Transform pair $i^-$ and $j^{-1}$ (e.g., decoding pair (k, l)).

In one embodiment, the server 106 communicates a set or sets of Affine Transform Tables 108 encoded, e.g., encrypted, for instance, utilizing an XOR function with first synchronous key 102 generated (as described in FIG. 2). The tracking device 104 decodes, e.g., decrypts, the set or sets of Affine Transform Tables 108 using the first synchronous key with, for instance, an XOR function. The set or sets of Affine Transform Tables 108, in one example, may be stored in a memory location, e.g. internal or external memory device electrically coupled or connected to the tracking device 104. The tracking device 104 communicates an acknowledgement receipt upon successful decryption of the set or sets in Affine Transform Tables 108 to the server 106. The tracking device 104 communicates to the server 106 an identification number, e.g., serial number, IMEI (International Mobile Equipment Identity), or the like, encrypted with encoding pairs selected from the Affine Transform Tables 108. Upon successful decryption of the identification number, the server 106 communicates a confirmation receipt to the tracking device 104.

In one embodiment, two sets of Affine Transform Tables 108 are stored in the tracking device 104: a first set that corresponds to encoding pairs (i, j) for messages from the tracking device 104 to the server 106, and a second set that corresponds to decoding pairs (i, j) to decode messages from the server 106 to the tracking device 104. In this same embodiment, two sets of Affine Transform Tables 108 are stored in the server 104: a first set of encoding pairs (i, j) to encode messages from the server 106 to the tracking device 104 and a second set of decoding pairs (i, j) to decode messages from the tracking device 104 to the server 106. In one example, prior to communicating a message, the tracking device 104 encodes the message with Affine Transform pairs from the Affine Transform Tables 108.

In one embodiment, the Affine Transform pairs selected are determined by a message ID, e.g., transmitted with the message, which may be incremented after a message, is decrypted or encrypted. The server 106 and/or the tracking device 104, for instance, utilize a message ID to determine which decoding pair to use for a received message, or which encoding pair to use to transmit a message. In one embodiment, because each message is encrypted with distinctive pairs from the Affine Transform Tables 108, the encryption appears to be random; thus, even if an eavesdropper decodes the encoding pairs, these pairs cannot be used to decode future received messages. The tracking device encrypts a message with an Affine Transform pair using the following: encrypted message=((message bytes)*i+j) mod $2^{bit\_count}$. Two byte encrypted messages are selected within a range of 0 to 65535 (i.e., $2^{16}-1$). 4 byte encrypted messages are selected within a range of 0 to 4,294,967,295 (i.e., $2^{32}-1$). N byte encrypted messages are selected within a range of 0 to $2^n-1$.

In another embodiment, the tracking device 104 encrypts a message of 43072 using encoding pair (i, j), e.g., 54161, 50552. The tracking device 104 communicates the encrypted message ((43072)*54161+50552) mod 65536=53688 to the server 106. In accordance with the message ID, the server 106 selects a decoding pair (k, l), e.g., 19825, 48648, to decode the encrypted message. The server 106 decrypts the message using the calculation ((53688)*19825+48648) mod 65536=43072. In this embodiment, the encoding pair (i, j) is unknown to the server 104 and the decoding pair (k, l) is unknown to the tracking device 104. The server 106 encrypts a message with an encoding pair (i, j) distinctive from the encoding pair (i, j) of the tracking device 104. The tracking device 104 receives the message from the server 106. The tracking device 104 decrypts the message with a corresponding decoding pair (k, l) to a message encoding pair (i, j) in accordance with, for instance, a message ID. In one example, the message ID may be communicated with the message from the tracking device 104 or be a message counter associated with the tracking device 104.

Consequently, a first set of encryption values, e.g., encoding pairs (i, j), encrypt transmitted messages from the tracking device 104 while a second set of encryption values, e.g., encoding pairs (i, j) are utilized for transmitted message from the server 106. In addition, a first set of decoding pairs (k, l) decrypt received messages at the server 106 are utilized while a second set of decoding pairs (k, l) to decrypt received messages at the tracking device 104. Thus, distinctive decoding pair (k, l) or an encoding pair (i, j) for either a transmitted or received message (either at the server 106 or the tracking device 104) prevents detection of future communicated messages.

In summary, at a first encryption scheme (level), the tracking device 104 prepares a message for transmission. Using the Affine Transform Tables 108, a message is encrypted such that a corresponding pair of different numbers is required to decrypt the message. The encryption/decryption process advantageously requires minimal or no additional headers, exchange of keys within the message, or shared dictionaries, such as shared dictionary 116, at the tracking device 104 or the server 106. Because the tracking device 104 and the server 106 exchange frequently involve message lengths of a few bytes, e.g., in a 2 to 10 byte range, cryptography using Affine Transform pairs is desirable to substantially maintain message length (e.g., with no or minimal increase in message length).

Advantageously, messages encrypted using Affine Transform pairs add minimally to message overhead, e.g., so that small byte messages, e.g., short message service messages (SMS), remain small byte messages. Another advantage of using Affine Transform Tables 108 is encryption pairs and the decryption pairs are distinctive; thus, even if an eavesdropper intercepts the encryption pairs, the eavesdropper will still have to crack the decryption pair to understand content of the message. In addition, an eavesdropper could not use a previous encoding pair to send a malicious message to a tracking device 104 because the previous encoding pair would be invalid for future messages. Furthermore encrypting the Affine Transform Tables 108 with the first synchronous key 102 before transmission allows the asynchronous key transmission; thus, an eavesdropper would be trawled from recognizing the type of encryption (e.g., even if identify an encryption or decryption key, the eavesdropper would have to independently identify (and crack) the one or more synchronous keys to retrieve contents of the message.)

Referring to FIG. 4, the tracking device 104 and the server 106 exchanges second cipher seed values. The exchange results in a generation of synchronous keys, e.g., for encryption and decryption of messages, over an insecure network—similar to the discussion associated with FIG. 2 above. Referring to Table III, the tracking device 104 and the server 106 exchange a prime random number p and a primitive root g. For instance, the tracking device 104 and the server 106 agree to use a prime number p=705011 and a primitive root g=2. The server 106 chooses, for example, a private number, e.g., secret random number a between 1 and p−1, of 521893. The tracking device 104 chooses, for example, a private number, e.g., a secret random number b between 1 and p−1, of 80521. The server 106 calculates a first intermediate key $V=g^a \bmod p$ and communicates the first intermediate key to the tracking device 104. The tracking device 104 acknowledges receipt of the first intermediate key to the server 106. The tracking device 104 calculates a second intermediate secret key $W=g^b \bmod p$ and communicates the second intermediate key to the server 106. The server 106 acknowledges receipt of the second intermediate key to the tracking device 104. The tracking device 104 computes $(g^b \bmod p)^a$ and the server 106 computes $(g^a \bmod p)^b$. The tracking device 104 and the server 106 possess a second secret key 109 because $(g^a \bmod p)^b = (g^b \bmod p)^a$.

After second secret key generation, this embodiment advantageously discards the secret random numbers a and b; thus, no long term private keying material exists to disclose to eavesdroppers. The tracking device 104 or the server 106 may generate another second secret (e.g., including the generation of secret random numbers, e.g., a, b, whenever it is desirable to generate a new second secret key. Thus, the security key may be changed on a message-to-message basis or on the happening of a specified event. Generation of the secret random numbers a and b may occur when the tracking device 104 charges in a battery charger. In one variant of this example, the battery charger may be electrically coupled to, for instance, to the server 106 using a wired or wireless communication network.

TABLE III

Server and Tracking Device calculate Synchronous Key2

1) Set prime p = 705011 (public knowledge)
2) Set generator g = 2 (public knowledge)
3) Server selects secret value a = 521893 (known only to Server)
4) Server calculates $V = g^a \bmod p = 2^{521893} \bmod 705011 = 592327$
5) Server transmits V = 592327 to Tracking Device (can be known to anyone)
6) Tracking Device selects secret value b = 80521 (known only to Tracking Device)
7) Tracking Device calculates $W = g^b \bmod p = 2^{80521} \bmod 705011 = 20301$
8) Tracking Device transmits W = 20301 to Server (can be known to anyone)
9) Server & Tracking Device independently calculate $K = V^b \bmod p = 592327^{80521} \bmod 705011 = 281049 = 20301^{521893} \bmod 705011 = W^a \bmod p$ (known only to Server & Tracking Device)

Referring to Table IV, to increase security of the second synchronous key, the server 106 may translate a value of the second secret key 109 utilizing, for example, an integer, and, in one variant, perform a MD5 hash calculation to generate a key of 128 bytes.

Referring to FIG. 5, a second encryption scheme is illustrated. As part of an encryption setup procedure (see Table IV), the server 106 communicates a table of random numbers to the tracking device 104 as part of an encryption setup procedure. In one instance, the server 106 communicates a table of random numbers 112, for example, "Exclusive Or" (XOR) with a second synchronous key 109 to the tracking device 104. The tracking device 104 decrypts the table of random numbers 112, for example, by performing an "Exclusive Or" (XOR) with the second synchronous key 109. The tracking device 104 sends an acknowledgement receipt to the server 106 indicating successful decryption of the table of random numbers 112 (mask values, for instance, in step 18 of Table IV) and stores the mask values in memory. In one variant, the tracking device 104 stores a table of synchronous keys 117 (e.g., exchanged via Diffie-Hellman). A message ID, e.g., provided with the message, determines which synchronous key to select from the table of synchronous keys 117, for decrypting the table of random numbers 112. Accordingly, each byte set of the table of random numbers 112 may be masked with distinctive synchronous key values from the table of synchronous keys 117 responsive to a value of a message ID.

In one example, the tracking device 104 communicates in a message an identifying value such as an identification number, e.g., IMEI (International Mobile Equipment Identity), encrypted with a value selected from the table of random numbers 112 and an encryption pair from the Affine Transform Tables 108. The server 106 decrypts the identification number using the value selected from the table of random numbers and a corresponding decryption pair (to the encryption pair) from the Affine Transform Tables 108. The server 106 acknowledges successful decryption of contents of the message to the tracking device 104. The tracking device 104 sends an acknowledgement to the server 106 that utilizes the second encryption/decryption scheme.

Using the second encryption scheme, messages communicated between the server 106 and the tracking device 104 are encrypted, e.g., in 16 byte increments, utilizing values from the table of random numbers 112 and an encryption pair from the Affine Transform Tables 108. The server 106 and the tracking device 104 agree which encryption values to use, and each confirms or acknowledges its use of these encryption values. In one example, each message includes an index counter 119 incremented upon receipt of a new message. The counter(s) determine(s) which encryption values to use from which table(s), e.g., synchronous key table(s) 117 or Affine transform tables 108. In one variant, counters 122 are individually associated with transmit and receive messages, and a counter (e.g., non-encrypted) value is included as part of transmit or receive message.

In one embodiment, 64 sets of encryption pairs within the Affine Transform Tables 108 are utilized to uniquely encrypt messages 1 through 64. In one variant, once these encryption values have been used, the tracking device 104 may reuse values (e.g., $1^{st}$ set of encryption pairs) or the tracking device 104 and the server 106 may generate new sets of encryption pairs (e.g., communicate new set of Affine Transform Tables 108 utilizing Diffie-Hellman exchange). In another variant, a pseudo-random rolling key may be associated with at least one of the tracking device 104 and the server 106. In yet another variant, a coordinated pseudo-random rolling key may be utilized (stored or securely communicated to) by each the tracking device 104 and the server 106 to coordinate selection of encryption/decryption pairs (e.g., of the 64 sets of encryption values).

In one embodiment, a message is encrypted utilizing a key selected from the table of random numbers 112 and an encryption pair selected from asynchronous vector transform pairs, e.g., the Affine Transform Tables 108. Advantageously, the second encryption scheme (level) provides message security utilizing pairs of asynchronous vector transform pairs (obtained from an information exchange utilizing a first synchronous key independently generated by both parties) and a key selected, e.g., randomly or pseudo-randomly by the server 106 or the tracking device 104, from the table of random numbers 112. In one embodiment, the table of random numbers 112 obtained form an information exchange utilizing a second synchronous key independently generated by each party, e.g., the tracking device 104 associated with an object or an individual and the server 106).

Consequently, the second encryption scheme provides not only two levels of security protection that need to be decrypted by an eavesdropper but also requires an eavesdropper to intercept the previous key exchanges (and properly decode each) to decrypts message contents. Furthermore, even if the eavesdropper receives decrypts a previously sent message: the first synchronous key, the second synchronous key, the asynchronous vector pairs, and the random number table, these items may be generated on a periodic basis (or on a message-by-message basis); thus, the eavesdropper would be required to continuously crack the keys to successfully intercept any future message. Because the first encryption scheme and the second encryption scheme add minimally to message overhead, a short message service message (SMS) remains a short message service message as compared to other available cryptology schemes, such as AES described previously.

Referring to Table IV, to further increase message security, a message digest algorithm 5 (MD5) which is a cryptographic hash function may transform data of the message. In one example, the transform includes perform a one-way function on the contents of the message that cannot be readily reversed. When MD5 calculations are performed during a message exchange, a 128 hash value may result to further prevent unauthorized message decryption.

Referring again to Table IV, an encryption setup procedure is provided for the tracking device 104. In this example, the tracking device 104 performs an encryption set-up process with the server 106. This process may be repeated on a periodic basis to refresh the keys and create new encryption tables. In one exemplary embodiment, a key refresh may occur when the tracking device 104 is placed on a battery charger (and this refresh process may several times or at designated periods of the day). The encryption setup procedure, in this example, is initiated by the server 106. In one variant, the encryption setup may be initiated by the tracking device 104.

TABLE IV

Encryption Setup Procedure

| Step | Actor | Message | Parameters/Comments |
|---|---|---|---|
| 1 | server | begin encryption setup | |
| 2 | tracking device | acknowledge | |
| 3 | server | begin D-H used to encrypt set or sets in Affine Transform Table | Diffie-Hellman p, g, and W values used to generate key1 (a synchronous key) to use to encrypt values (e.g., pairs) in Affine Transform Tables |
| 4 | tracking device | return V | Diffie-Hellman V value |
| | | At this point, the tracking device and server independently calculate key1 (e.g., synchronous mask key1) | |
| 5 | server | k1 adjustment for key1 | k1 is a constant value, e.g., integer, added to key1. A tracking device performs a MD5 hash of k1 to and creates a key1 of 128 bits. |
| 6 | tracking device | acknowledgement receipt | tracking device has generated key1 |
| 7 | server | Affine Transform values (e.g., pairs) | Generate a count of Affine Transform pairs and pairs encrypted with key1 |
| 8 | tracking device | acknowledgement receipt | MD5 of the decrypted pairs. A tracking device has decrypted the Affine Transform pairs with key1 and stored them as one or more tables in memory. |
| 9 | server | confirmation receipt (encryption/decryption at level one) | A tracking device identifying value such as serial number (e.g., IMEI) is encrypted using Affine Transform pairs from the Affine Transform Tables. |
| 10 | tracking device | acknowledgement receipt (encryption/decryption at level one) | A tracking device decrypts the identifying value such as serial number (e.g., IMEI) using Affine Transformation Tables |
| | | If confirmation fails, the server initiates the procedure again | |
| 11 | server | switch to "Level 1" encryption mode (encryption/decryption at level one) | |

TABLE IV-continued

Encryption Setup Procedure

| Step | Actor | Message | Parameters/Comments |
|---|---|---|---|
| 12 | tracking device | acknowledgement receipt (encryption/decryption at level one) | |
| | | At this point, tracking device and server encrypt all messages using Affine Transform Tables (and not using key1). | |
| 13 | Server | begin D-H for mask (encryption/decryption at level one) | Diffie-Hellman p, g, and W values used to generate an encryption mask table |
| 14 | tracking device | return V | Diffie-Hellman V value |
| | | At this point, tracking device and server can calculate key2 (e.g., synchronous mask key2) independently | |
| 15 | Server | adjust k2 and create a mask key2 (encrypted at level one) | Integer added to k2 and tracking device performs MD5 hash on k2 to create key2. |
| 16 | tracking device | acknowledge (encrypted at level one) | tracking device has generated key2. |
| 17 | Server | mask values (encrypted at level one) | A count of and mask values (e.g., table of random numbers) are encrypted with key2. |
| 18 | tracking device | acknowledge (encrypted at level two) | MD5 of the mask values (e.g., table of random numbers). A tracking device decrypts the mask and stores the mask values (e.g., table of random numbers) in memory. |
| 19 | Server | confirm receipt (encrypted at level two) | A tracking device's identifying value (e.g., IMEI (International Mobile Equipment Identity) encrypted using Affine Transform Tables and the mask values (e.g., table of random numbers). |
| 20 | tracking device | acknowledgement receipt (encrypted at level two) | A tracking device decrypts an identifying value (e.g., the IMEI) using Affine Transform Tables and the mask values (e.g., table of random numbers). |
| | | If confirmation fails, the server will initiate the procedure again at the first step | |
| 21 | Server | switch to "level 2" encryption mode (encryption/decryption at level two) | |
| 22 | tracking device | acknowledgement (encryption/decryption at level two) | |
| | | At this point, encryption is complete with Affine Transform values (e.g., pairs) (asynchronous key masking) and key2 (synchronous key masking). | |

Message Compression

Figure 6:
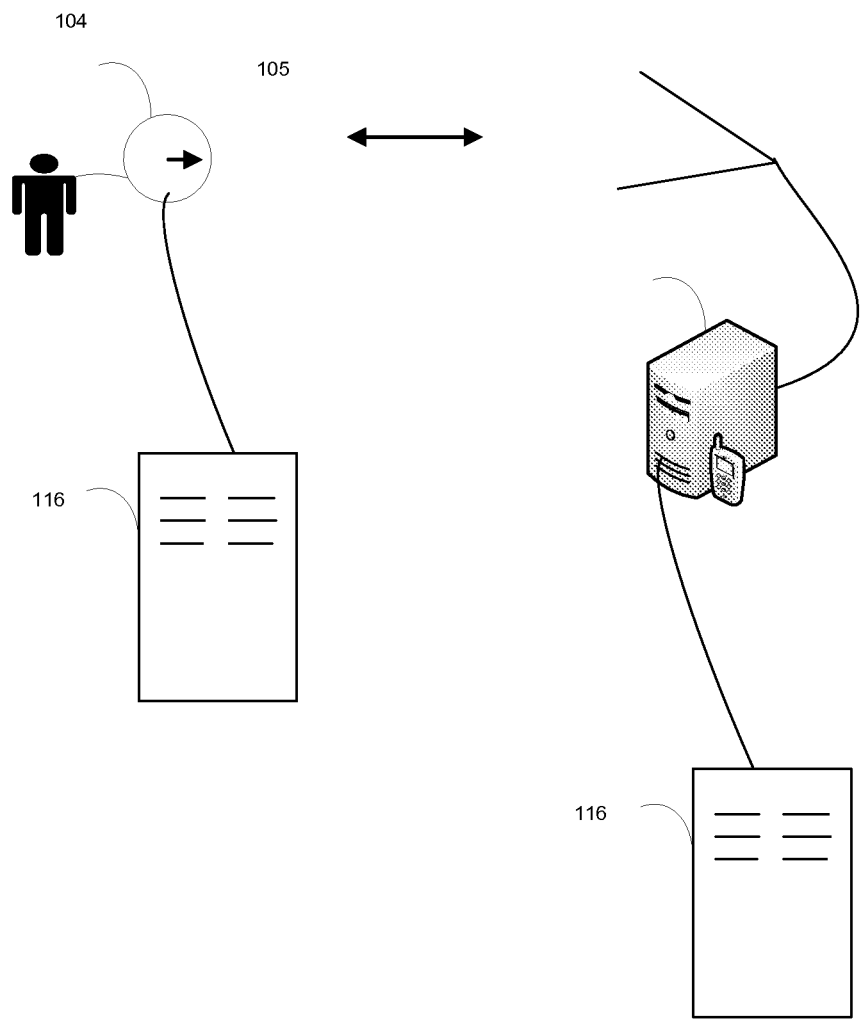
FIG. 6 is a diagram illustrating a message compression methodology in accordance with an embodiment of the present invention.

Referring to FIG. 6, a message compression methodology may enhance security as well as reduce message size. In one embodiment, a tracking device 104 includes one or more stored latitude and longitude points (e.g., waypoints) in memory. In one example, the latitude and longitude points each have at least four bytes of memory. In one instance, the latitude and longitude points will be referenced with an index value. In one embodiment, upon transmission of location coordinates, a tracking device 104 references its current location from its stored location points using, for example, delta values or polar coordinates. In this instance, the tracking device 104 may transmit an index value that references its current location and a data value representing the difference in latitude and longitude using, for instance, x and y coordinates or polar coordinates.

Transmission of an index value of one byte and polar coordinate values of a two-byte delta allows us to represent a location coordinate with 5 bytes versus 8 bytes (e.g., 4 byte latitude coordinate, 4 byte longitude coordinate). Thus, this embodiment has a potential to reduce memory requirements for a tracking device 104 communicating repetitive data in a message. Repetitive data communication may occur during communication of location coordinates over a same latitude and/or longitudinal region for an extended period. Furthermore, the embodiment reduces message storage requirements of similar latitude and/or longitudinal points, which would unnecessarily increase message size. The message compression methodology maps longer patterns of data bytes or characters, in this example, the similar or close latitude and longitudinal points, to a unique character combination (including index value).

In one variant, the unique character combination may be stored, e.g., as a mapping function in one or more tables represented as shared dictionary 116, by at least one of the tracking device 104 and the server 106. The unique character combination being a smaller byte size than the redundant data bytes or characters it replaces will reduce message size; thus, the tracking device 104 and the server 106 exhibit enhanced message transmission efficiency. Advantageously, this embodiment provides by replacing redundant message bytes, e.g., redundant latitude and/or longitudinal points with a unique character combination, increases transmission security because the eavesdropper to accurately decrypt a compressed message would require knowledge of one or more unique character combinations.

In another example, the tracking device 104 and the server 106 communicate compressed messages over a wireless network. In this embodiment, a message compression algorithm operates within a data module of the User Datagram Protocol (UDP). In one variant, the Transmission Control Protocol (TCP) and UDP headers are not compressed. The message compression algorithm adapts to advantageously account for redundancies associated with information communicated between the tracking device 104 and the server 106. In particular, the message compression algorithm monitors environmental factors (e.g., location coordinates and other variables) of the tracking device 104. Environmental factors include: geographic area, usage pattern, messaging frequency, messaging requirements (e.g., short message service (SMS), data, voice, streaming video, or the like), charging in a battery charger, connected to a communication port (e.g., Universal Serial Bus (USB) to a computer or host personal), and its ability to transmit voice, data, or streaming video with reduced or no cost, such as when attached to a network associated with the server 106.

In one embodiment, the shared dictionary 116 is maintained within the tracking device 104 and the server 106. The server 106 advantageously maintains the shared dictionary 116 and transmits the shared dictionary 116 to the tracking device 104 via, for example, a USB connection when there is the possibility of reduced cost or no cost data traffic. The server 106 may generate the shared dictionary 116 during a scheduled event, e.g., regular audit and analysis process, or at a scheduled time period. In one embodiment, during shared dictionary 116 generation, the server 106 analyzes previous uncompressed messages between the server 106 and the tracking device 104 for repetitive byte patterns. If a byte pattern is determined a good candidate for the shared dictionary 116, the server 106 adds it (e.g., replacing an infrequently used dictionary entry if necessary).

In one embodiment, the shared dictionary 116 generated may be two dictionaries: one for inbound messages and one for outbound messages. The shared dictionary 116 may be associated with, e.g., the tracking device 104, or may be part of a group of tracking devices that share attributes of the shared dictionary 116. The server 106 and the tracking device 104 may utilize the dictionary differently to maximize message transmission efficiency over a wireless network. In one embodiment, the method may indicate a "protocol version" element in a message group header.

Lookup Mask

A message is analyzed for byte patterns that already exist in the shared dictionary. If a byte pattern previously exists, a corresponding portion of the message is substituted with a single-byte index representative of the byte pattern. During or shortly before message processing, a lookup mask is generated. The lookup mask, in one example, is a single-bit array. In one instance, "0" indicates the byte is actual data, and "1" indicates the byte should be replaced with the corresponding dictionary entry. Consequently, the lookup mask being transmitted with the message increases message transmission size by approximately 12.5% because, in this example, one bit is added for every byte in the message. Accordingly, the message compression by replacing redundant portion of the message with a reduced size byte pattern and the lookup mask creates a reduced message length to occupy a smaller byte size even with the addition of the lookup bytes.

In one example, a message "TO BE OR NOT TO BE" is compressed before transmission over a wireless network. The shared dictionary 116 includes the string "TO BE" in location 09, and a message header contains a length of the compressed message. This compression method would examine:

| Message | | | | | | | | | | | | | | | | | |
|---|---|---|---|---|---|---|---|---|---|---|---|---|---|---|---|---|---|
| T | O | | B | E | | O | R | | N | O | T | | T | O | | B | E |
| Byte (hex) 54 | 4F | 2 | 4 | 4 | 20 | 4 | 52 | 2 | 4E | 4 | 54 | 2 | 54 | 4F | 2 | 42 | 45 |
| Location 0 | 1 | 2 | 3 | 4 | 5 | 6 | 7 | 8 | 9 | 1 | 11 | 1 | 13 | 14 | 1 | 16 | 17 |

Dictionary Item 09="TO BE"

Message Length=18

The message compression algorithm replaces instances of "TO BE" with the dictionary index of 09. The new message is now:

| Message | | | | | | | | | |
|---|---|---|---|---|---|---|---|---|---|
| 09 | | O | R | | N | O | T | | 09 |
| Byte 09 | 20 | 4F | 52 | 20 | 4E | 4F | 54 | 20 | 09 |
| Location 0 | 1 | 2 | 3 | 4 | 5 | 6 | 7 | 8 | 9 |

Message Length=10

To decompress a message, there are bytes that represent actual values and those which represent a dictionary lookup value. Therefore, a bitmapped Lookup Mask is generated to indicate the 1st and 10th bytes should be replaced with the corresponding dictionary entry. The bitmask is therefore 1000000001. Converted to base 16, this mask is 0201. Therefore, the message for transmission is:

| Message | | | | | | | | | | | |
|---|---|---|---|---|---|---|---|---|---|---|---|
| 09 | | O | R | | N | O | T | | 09 | 02 | 01 |
| Byte 09 | 20 | 4F | 52 | 20 | 4E | 4F | 54 | 20 | 09 | 02 | 01 |
| Location 0 | 1 | 2 | 3 | 4 | 5 | 6 | 7 | 8 | 9 | 10 | 11 |

Message Length=10

When decompressing, the message length is 10 bytes and the lookup mask includes two bytes (e.g., the integer value of 10/8). To retrieve a message value, the lookup mask provides an inverse of the compression steps, replacing appropriate bytes with strings from the shared dictionary 116 and recreating the message. As a result, the above message has been reduced from eighteen characters to twelve characters; thus, the reduced message size improves message transmission efficiency by 33%.

Out-of-Band Indices

The message is analyzed for byte patterns that exist in the dictionary. In one example, if a pattern exists of three or more bytes long, it is replaced with a single-byte index associated with the pattern. Once the entire message is processed, a list of indices generated indicates positions of the message bytes to replace. The list of indices is sent to the end of the message (i.e. out-of-band). This method requires two bytes for each pattern to be replaced (the index and its position) but does not add to byte count of the message; thus, this method may advantageously produce reduced byte messages when replacing a small number of longer byte message patterns.

For example, a message "TO BE OR NOT TO BE" is designated for compression. The shared dictionary contains the string "TO BE" in location 09, and the message header contains a length of the compressed message.

| | Message | | | | | | | | | | | | | | | | | |
|---|---|---|---|---|---|---|---|---|---|---|---|---|---|---|---|---|---|---|
| | T | O | | B | E | | O | R | | N | O | T | | T | O | | B | E |
| Byte | 54 | 4F | 20 | 42 | 45 | 20 | 4F | 52 | 20 | 4E | 4F | 54 | 20 | 54 | 4F | 20 | 42 | 45 |
| Location | 0 | 1 | 2 | 3 | 4 | 5 | 6 | 7 | 8 | 9 | 10 | 11 | 12 | 13 | 14 | 15 | 16 | 17 |

Dictionary Item 09="TO BE"

Message Length=18

This compression algorithm replaces all instances of "TO BE" with the dictionary index of 09. The compressed message at this point is:

| | Message | | | | | | | | | |
|---|---|---|---|---|---|---|---|---|---|---|
| | 09 | | O | R | | N | O | T | | 09 |
| Byte | 09 | 20 | 4F | 52 | 20 | 4E | 4F | 54 | 20 | 09 |
| Location | 0 | 1 | 2 | 3 | 4 | 5 | 6 | 7 | 8 | 9 |

Message Length=10

To decompress the message, bytes that represent actual values and those that represent a dictionary lookup are depicted. A list generated indicates which bytes to replace with one or more corresponding dictionary entries. In this example, the positions are 00 and 09 so the list is "0009". Therefore, the entire message is

| | Message | | | | | | | | | | |
|---|---|---|---|---|---|---|---|---|---|---|---|
| | 09 | | O | R | | N | O | T | | 09 | 00 | 09 |
| Byte (hex) | 09 | 20 | 4F | 52 | 20 | 4E | 4F | 54 | 20 | 09 | 00 | 09 |
| Location | 0 | 1 | 2 | 3 | 4 | 5 | 6 | 7 | 8 | 9 | 10 | 11 |

Message Length=10

When decompressing, the message length is 10 bytes and the remaining two bytes indicate which byte positions to replace with values from the shared dictionary 116. Consequently, the first and tenth bytes are replaced with corresponding strings from the shared dictionary 116 and re-create the message. In this example, the message has been compressed from 18 characters to 12 characters to realize a byte savings of 33%

Figure 7:
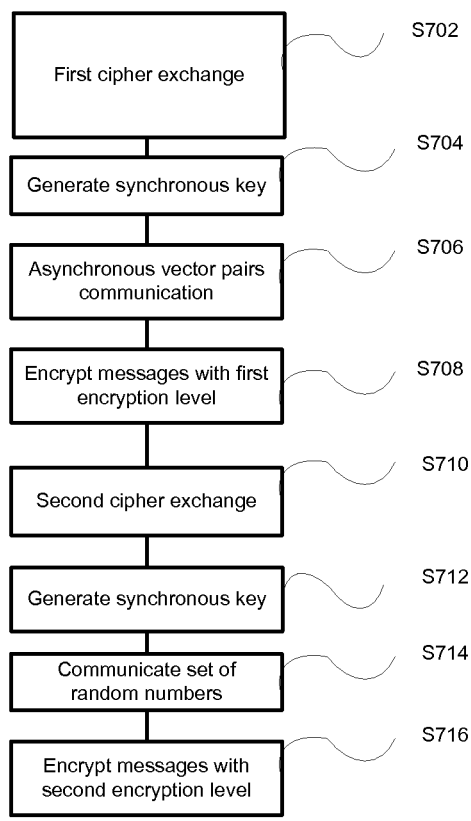
FIG. 7 is a flow diagram illustrating a method for decoding and encoding messages in accordance with an embodiment of the present invention.

Referring to FIG. 7, a first party, e.g., a first the tracking device 104, and a second party, e.g., a server 106, exchanges first cipher information (S702). The first party and the second party independently generate a first synchronous key (S704). Asynchronous vector transform pairs are communicated between the first party and the second party encrypted with the first synchronous key (S706). Using a first encryption level, messages are communicated encrypted with at least one of the asynchronous vectors pairs (S708). The first party and the second party exchange second cipher information (S710). The first party and the second party independently generate a second synchronous key (S712). A set of random numbers are encrypted with the second synchronous key and communicated between the first party and the second party (S714). Using a second encryption level, messages are communicated encrypted with a selection from the set of random numbers and the asynchronous vector transform pairs (S716).

It is noted that many variations of the methods described above may be utilized consistent with the present invention. Specifically, certain steps are optional and may be performed or deleted as desired. Similarly, other steps (such as additional cipher key information exchanges, additional synchronous key generation, generate or exchange more sets of asynchronous vector pairs, sampling, processing, filtration, calibration, larger byte size messages, or other mathematical analysis) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An system to securely communicate location coordinate information over an insecure communication channel, comprising:
a tracking device to communicate first cipher seed values with a location coordinate monitoring station, the first tracking device generating a first synchronous key; and
a coordinate monitoring station that includes at least one hardware component that:
generates the first synchronous key independent of the location coordinate monitoring station, and selects randomly at least one asynchronous vector pair from an Affine Transform Table to encrypt with the first synchronous key before transmitting at least one of the asynchronous vector pairs to the tracking device, wherein the tracking device decrypts the asynchronous vector pairs using the first synchronous key and receives and transmits messages utilizing encryption based on the at least one of the asynchronous vector pairs and on the first synchronous key.

2. The system of claim 1, wherein the tracking device is configured to communicate second cipher seed values with the location coordinate monitoring station and wherein the tracking device and the location coordinate monitoring station are configured to independently generate a second synchronous key.

3. The system of claim 2, wherein the location coordinate monitoring station is configured to communicate a set of random numbers encrypted with the second synchronous key to the tracking device.

4. The system of claim 3, wherein the location coordinate monitoring station and the tracking device encrypt and decrypt messages utilizing pseudo randomly selected asynchronous vector pairs and a number selected from the set of random numbers.

5. A system that securely communicates information over an insecure communication channel, the system comprising:
a server;
a tracking device associated with an object, the tracking device exchanging a first cipher code with the server;
wherein the tracking device and the server each independently generates a first secret key utilizing the first cipher code and a first selected random number only known respectively to either the tracking device or the server; and
wherein the server encrypts an Affine Transform table of asynchronous vector encryption and decryption transform pairs with the first secret key to form a first signal and communicates the first signal to the tracking device, wherein the server and the tracking device communicate messages utilizing encryption based on at least one of the asynchronous vector encryption transform pairs and on the first secret key.

6. The system of claim 5, wherein the tracking device and the server exchange a second cipher code.

7. The system of claim 6, wherein the server and the tracking device each generate a second secret key utilizing the second cipher code and a second selected random number only known respectively to either the tracking device or the server.

8. The system of claim 6, wherein the server encrypts a set of random numbers with the second secret key and sends the set of random numbers to the tracking device.

9. The system of claim 8, wherein messages communicated between the server and the tracking device are encrypted and decrypted using at least one pseudo-randomly selected number from the set of random numbers and at least one of the encryption and decryption asynchronous vector pairs.

10. The system of claim 8, wherein messages communicated between the server and the tracking device are encrypted and decrypted using at least one selected number from the set of random number and at least one of the encryption and decryption vector pairs.

11. A method for securely communicating location coordinates between at least one of a first party and a second party, comprising:
accessing an insecure communication channel by the first party and the second party;
selecting a first secret random number independently by a first party;
selecting a second secret random number independently by a second party;
independently computing by the first and the second party a first synchronous key, wherein at least one of accessing, selecting a first secret random number, or selecting a second secret random number is implemented using hardware;
transmitting a first asymmetric vector transform pair randomly selected from an Affine Transform Table and encrypted using the first synchronous key by at least one of the first party and the second party; and
encrypting and decrypting one or more message contents between the first party and the second party using the first asymmetric vector transform pair together with the first synchronous key.

12. The method of claim 11, further comprising the step of collectively selecting first and second pseudo-random values utilized for independently computing the first synchronous key by the first party and the second party respectively.

13. The method of claim 11, further comprising the step of exchanging cipher information to generate independently a second synchronous key by the first and the second party.

14. The method of claim 13, further comprising the step of communicating a pseudo-random number set encrypted by the second synchronous key between the first party and the second party.

15. The method of claim 14, further comprising the step of encrypting messages utilizing a second vector transform pair and at least one of the pseudo-random number set to securely communicate the message contents between the first party and the second party.

16. A method to securely communicate location coordinates of the tracking device over an insecure communication channel, the method comprising:
performing at least one cipher key exchange between the tracking device and a monitoring station;
calculating independently by the first tracking device at least one synchronous key utilizing a first secret key of the tracking device in response to receiving the at least one cipher key exchange;
calculating independently by the monitoring station at least one synchronous key utilizing a second secret key by the monitoring station in response to receiving the at least one cipher key exchange;
communicating at least one asynchronous vector transform pairs selected randomly from an Affine Transform Table and encrypted with the at least one synchronous key between the monitoring station and the first tracking device;
communicating at least one random number set encrypted with at least one synchronous key between the monitoring station and the first tracking device;
compressing messages comprising the location coordinates of tracking device to a reduced byte representation in response to detecting redundant location coordinates; wherein the reduced byte representation improves message security and decreases likelihood of detecting the location coordinates of the tracking device; and
encrypting the messages utilizing the at least one of asynchronous vector transform pairs and the at least one synchronous key to securely communicate the messages between the first tracking device and the monitoring station.

* * * * *